(12) United States Patent
Wu et al.

(10) Patent No.: US 10,753,528 B2
(45) Date of Patent: Aug. 25, 2020

(54) FLEXIBLE SCREEN SUPPORT DEVICE AND FLEXIBLE SCREEN

(71) Applicant: SHENZHEN ROYOLE TECHNOLOGIES CO. LTD., Shenzhen, Guangdong (CN)

(72) Inventors: Dan Wu, Guangdong (CN); Weifeng Wu, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/337,986

(22) PCT Filed: Sep. 29, 2016

(86) PCT No.: PCT/CN2016/100729
§ 371 (c)(1),
(2) Date: Mar. 29, 2019

(87) PCT Pub. No.: WO2018/058404
PCT Pub. Date: Apr. 5, 2018

(65) Prior Publication Data
US 2020/0025325 A1  Jan. 23, 2020

(51) Int. Cl.
*G09F 17/00* (2006.01)
*F16M 11/04* (2006.01)
*F16M 11/18* (2006.01)
*G09F 9/30* (2006.01)

(52) U.S. Cl.
CPC ............. *F16M 11/04* (2013.01); *F16M 11/18* (2013.01); *G09F 9/30* (2013.01)

(58) Field of Classification Search
CPC .. G09F 17/00; G09F 2017/0041; F16M 11/18
See application file for complete search history.

(56) References Cited

U.S. PATENT DOCUMENTS

| 4,372,071 A | * | 2/1983 | Vicino | G09F 19/00 40/603 |
| 5,463,827 A | | 11/1995 | Williams | |
| 2008/0086816 A1 | * | 4/2008 | Farooqui | A61B 6/0457 5/601 |

(Continued)

FOREIGN PATENT DOCUMENTS

| CN | 101712290 A | 5/2010 |
| CN | 103423564 A | 12/2013 |

(Continued)

OTHER PUBLICATIONS

International search report dated Jun. 7, 2017 from corresponding application No. PCT/CN2016/100729.

*Primary Examiner* — Gary C Hoge
(74) *Attorney, Agent, or Firm* — Hauptman Ham, LLP

(57) ABSTRACT

Disclosed is a flexible screen support device for supporting a flexible screen, the support device comprising a support plate, a first telescopic bracket, several second telescopic brackets located at both sides of the first telescopic bracket, wherein the first telescopic bracket and the several second telescopic brackets couple the support plate and the flexible screen, and the flexible screen forms a curved surface by means of the first telescopic bracket and the several second telescopic brackets.

19 Claims, 7 Drawing Sheets

(56) References Cited

U.S. PATENT DOCUMENTS

| | | | |
|---|---|---|---|
| 2009/0159768 A1* | 6/2009 | Oh | F16M 11/10 |
| | | | 248/284.1 |
| 2009/0229156 A1* | 9/2009 | Gettelfinger | G09F 7/20 |
| | | | 40/606.15 |
| 2014/0259824 A1* | 9/2014 | Jurewicz | G06F 3/04845 |
| | | | 40/466 |
| 2015/0145755 A1 | 5/2015 | Yamazaki et al. | |
| 2016/0035310 A1 | 2/2016 | Song et al. | |
| 2016/0120309 A1* | 5/2016 | Brandt | A47B 81/062 |
| | | | 361/679.01 |
| 2017/0030092 A1* | 2/2017 | Young | E04F 21/00 |
| 2017/0127833 A1 | 5/2017 | Hung | |
| 2017/0176841 A1* | 6/2017 | Ghyme | F16M 11/2085 |
| 2017/0204598 A1* | 7/2017 | Koo | E04B 1/19 |
| 2018/0211575 A1* | 7/2018 | Opsomer | G09F 17/00 |

FOREIGN PATENT DOCUMENTS

| | | |
|---|---|---|
| CN | 104197240 A | 12/2014 |
| CN | 104238923 A | 12/2014 |
| CN | 204537648 U | 8/2015 |
| CN | 105118390 A | 12/2015 |
| CN | 105225614 A | 1/2016 |
| CN | 205136973 U | 4/2016 |
| JP | 2006/23676 A | 1/2006 |
| JP | 2009-47849 A | 3/2009 |
| JP | 2011-128510 A | 6/2011 |
| JP | 2013-535706 A | 9/2013 |
| JP | 2015-521296 A | 7/2015 |
| KR | 10-2015-0061573 A | 6/2015 |
| TW | 202016102611 U1 | 6/2016 |

\* cited by examiner

FLEXIBLE SCREEN SUPPORT DEVICE AND FLEXIBLE SCREEN

RELATED APPLICATION

The present application is a National Phase of International Application Number PCT/CN2016/100729, filed Sep. 29, 2016.

TECHNICAL FIELD

The present disclosure relates to a field of flexible display screen, and more particularly, to a flexible screen support device and a flexible screen.

BACKGROUND

With the development of material technology, display screens can be made into a bendable form. Devices adopting flexible display screens enjoy many advantages, such as convenient to carry, bendable, freely deformable, etc. However, for now, the devices adopting flexible display screens also have some disadvantages, such as poor maneuverability due to lack of reliable support.

Traditional solution to the above problem is to attach the flexible display screen to a supporting body with a fixed shape (e.g. a curved surface). However, this solution only utilizes a good attaching property of the flexible display screen, which limits to display on the curved surface, without making full use of the freely deformable characteristic of the flexible display screen.

SUMMARY

Based on the above deficiencies, the present disclosure provides a flexible screen support device, which fully utilizes the freely deformable characteristic of the flexible display screen to benefit the diversification of the display of the flexible screen.

A flexible screen support device provided in the disclosure, configuring for supporting a flexible screen, includes a support plate; a first telescopic bracket; and a plurality of second telescopic brackets located on two opposite sides of the first telescopic bracket; wherein the first telescopic bracket and the plurality of second telescopic brackets couple the support plate and the flexible screen; wherein the first telescopic bracket and the plurality of second telescopic brackets drive the flexible screen to form a curved surface.

A flexible screen provided in the disclosure, includes a display surface, a back surface, and the flexible screen support device; wherein the flexible screen support device couples the back surface.

The flexible screen support device described in present disclosure supports the support plate and the flexible screen through the first telescopic bracket and a plurality of second telescopic brackets. The expansion and contraction of the first telescopic bracket and a plurality of second telescopic brackets in different degrees drive the flexible screen to form a curved surface, thus the flexible screen can have diversified display modes.

BRIEF DESCRIPTION OF THE DRAWINGS

In order to more clearly explain technical solutions in the embodiments of the present disclosure, drawings that need to be used in the embodiments will be briefly introduced below. Obviously, the drawings in the following description are only some embodiments of the present disclosure. For those ordinarily skilled in the field, other drawings can be obtained without paying creative work.

DETAILED DESCRIPTION

The following is a clear and complete description of the technical solution of the embodiments of the present disclosure, with reference to the drawings of the embodiments of the present disclosure.

Figure 1:
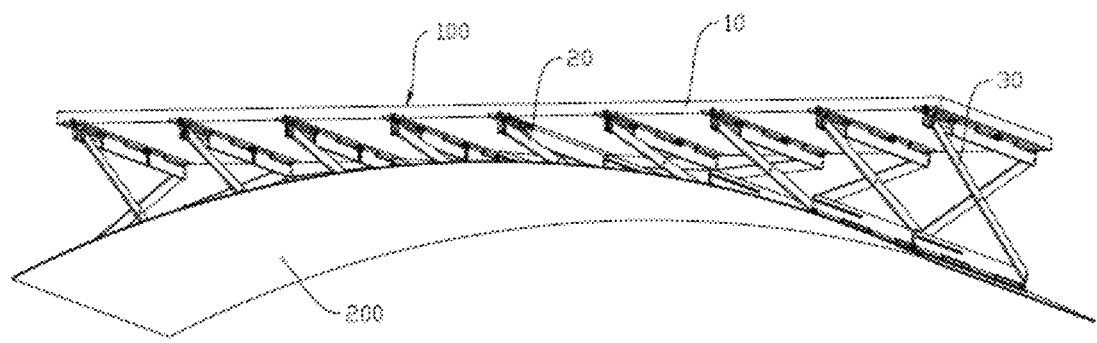
FIG. 1 is a schematic view of a flexible screen according to an embodiment of the present disclosure, wherein the flexible screen includes a flexible screen support device, the flexible screen is positioned in an arc form.

Referring to FIG. 1, a flexible screen support device 100 for supporting a flexible screen 200 is provided in an embodiment of the present disclosure. The flexible screen support device 100 includes a support plate 10, a first telescopic bracket 20, and a plurality of second telescopic brackets 30 locating on two opposite sides of the first telescopic bracket 20. The first telescopic bracket 20 and the plurality of second telescopic brackets 30 couple the support plate 10 and the flexible screen 200. The first telescopic bracket 20 and the plurality of second telescopic brackets 30 drive the flexible screen 200 to form a curved surface. The curved surface includes wave-shaped curved surface, arc-shaped curved surface, convex surfaces with angle defined therebetween or concave surface with angles defined therebetween, and the curved surface can also be replaced by flat surface.

Further, the plurality of second telescopic brackets 30 can rotate relative to a surface of the support plate 10.

Figure 5:
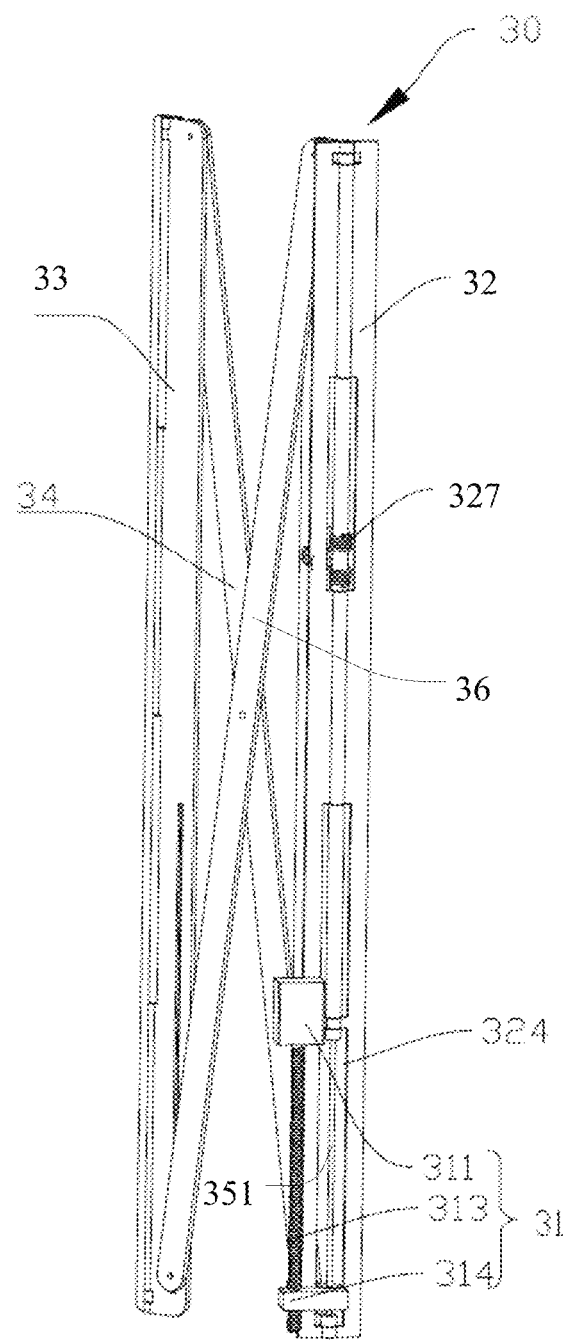
FIG. 5 is a schematic assembly diagram of the second telescopic bracket of the flexible screen support device shown in FIG. 2.
Figure 6:
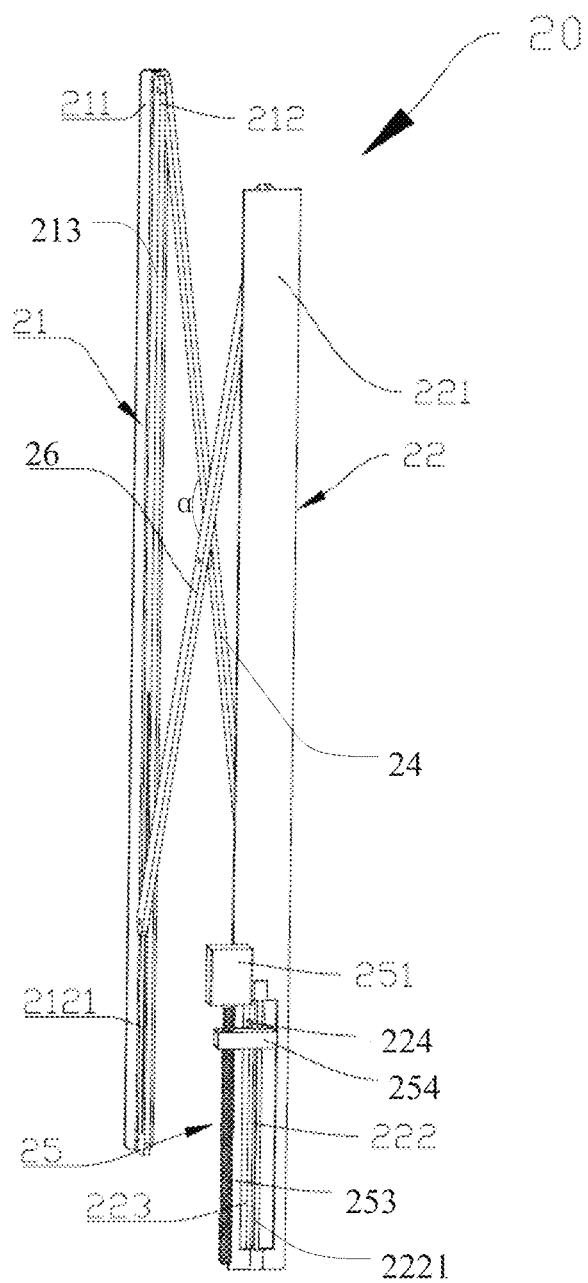
FIG. 6 is a schematic view of the first telescopic bracket of the flexible screen support device shown in FIG. 1.
Figure 7:
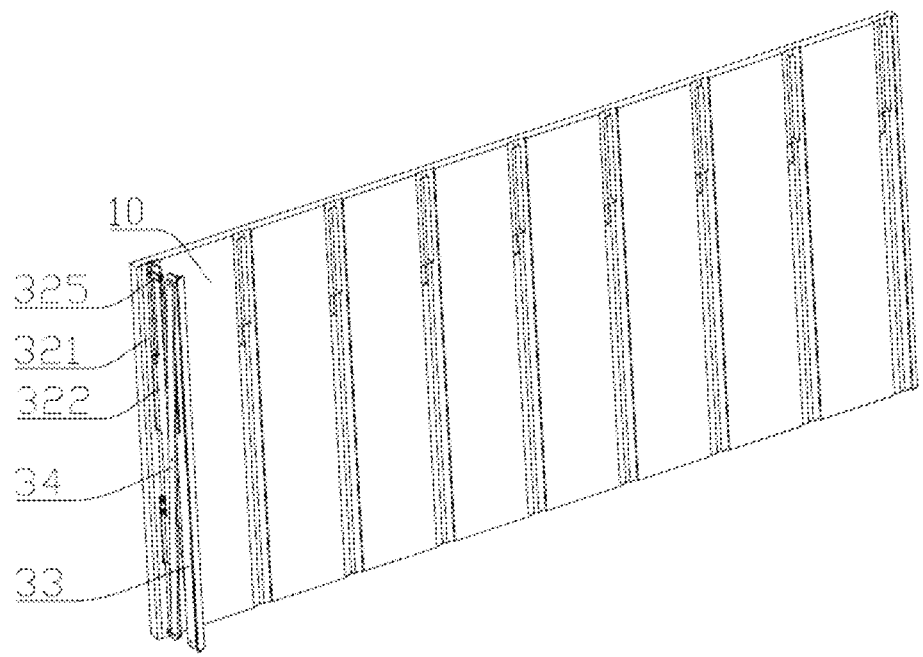
FIG. 7 is a schematic view of the flexible screen support device shown in FIG. 2, wherein the second telescopic bracket is contracted.

Further, as shown in FIGS. 5 and 6, the first telescopic bracket 20 couples a first driving unit 25, and each of the plurality of second telescopic brackets 30 couples a second driving unit 31.

Specifically, in an exemplarily embodiment, the first driving unit 25 and the second driving units 31 have the same structure. The second driving unit 31 includes a driving motor 311, a screw rod 313 coupling the driving motor 311, and a first driving block 314 sleeving on the screw rod 313. The screw rod 313 drives the first driving block 314 to enable the second telescopic bracket 30 to expand or contract. The first driving unit 25 includes a driving motor 251, a screw rod 253 coupling the driving motor 251, and a second driving block 254 sleeving on the screw rod 253. The screw rod 253 drives the second driving block 254 to enable the first telescopic bracket 20 to expand or contract.

Figure 2:
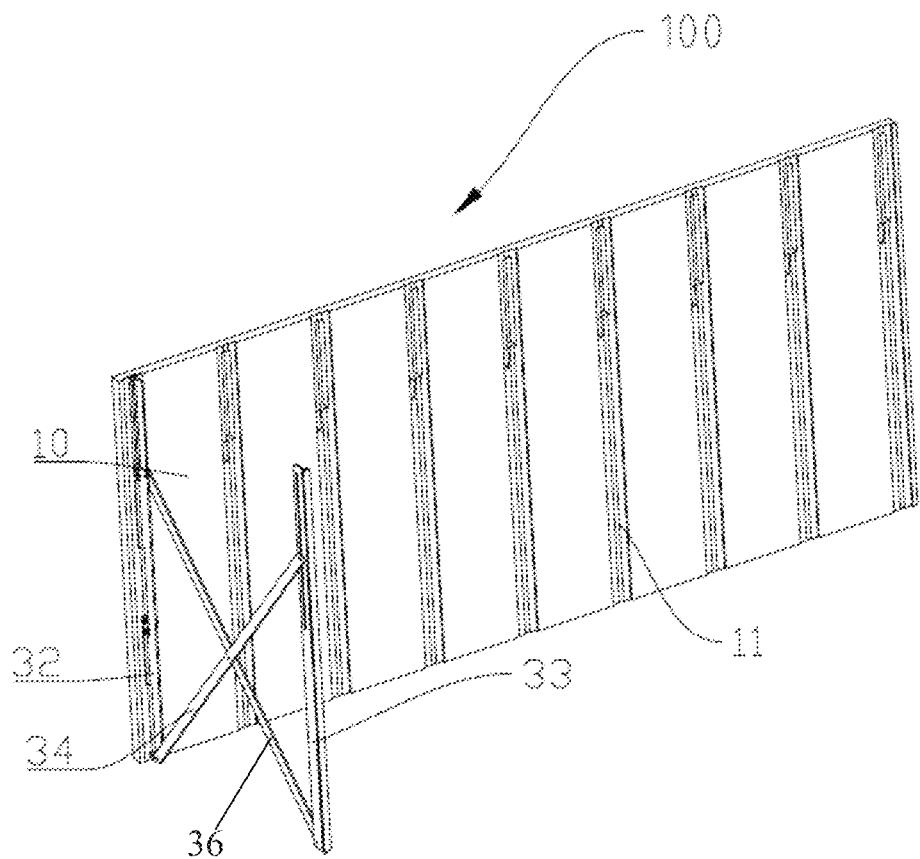
FIG. 2 is a schematic view of a portion of the flexible screen support device; wherein one second telescopic bracket of the flexible screen support device is expended.

Referring to FIG. 2, the support plate 10 is a rectangular plate. A plurality of assembly slots 11 are defined on one side of the support plate 10 and are spaced from each other. In one embodiment, the plurality of assembly slots 11 is strip-shaped. The assembly slots 11 configure to receive the first driving unit 25 of the first telescopic bracket 20 and the second driving units 31 of the plurality of second telescopic brackets 30. In one embodiment, the first driving unit 25 of the first telescopic bracket 20 receives in one of the plurality of assembly slots 11 which locates at the middle.

Figure 3:
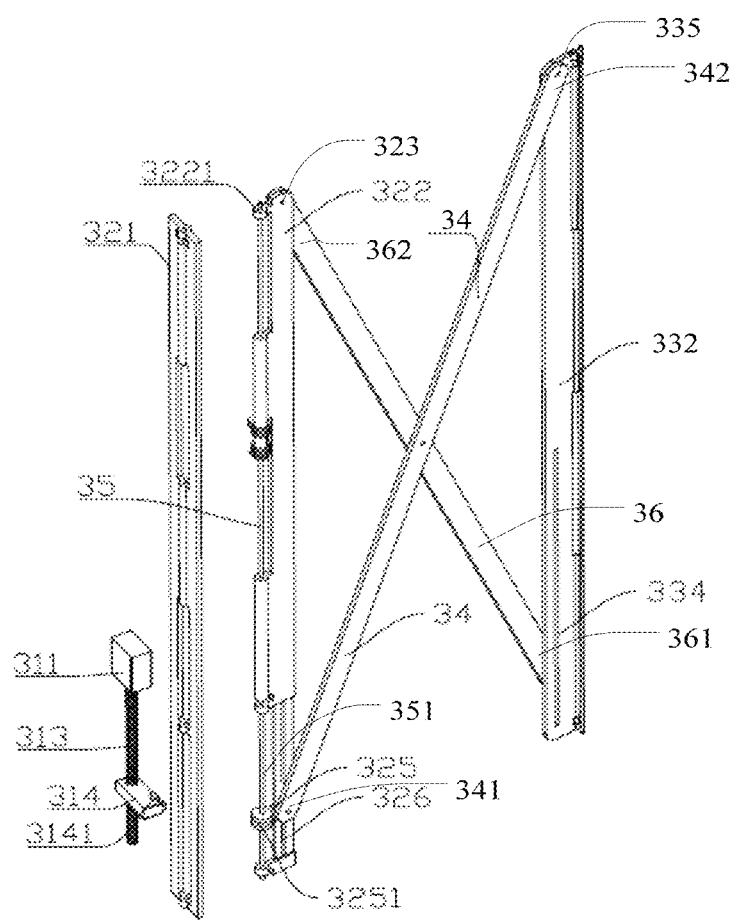
FIG. 3 is an exploded view of the second telescopic bracket shown in FIG. 2.
Figure 4:
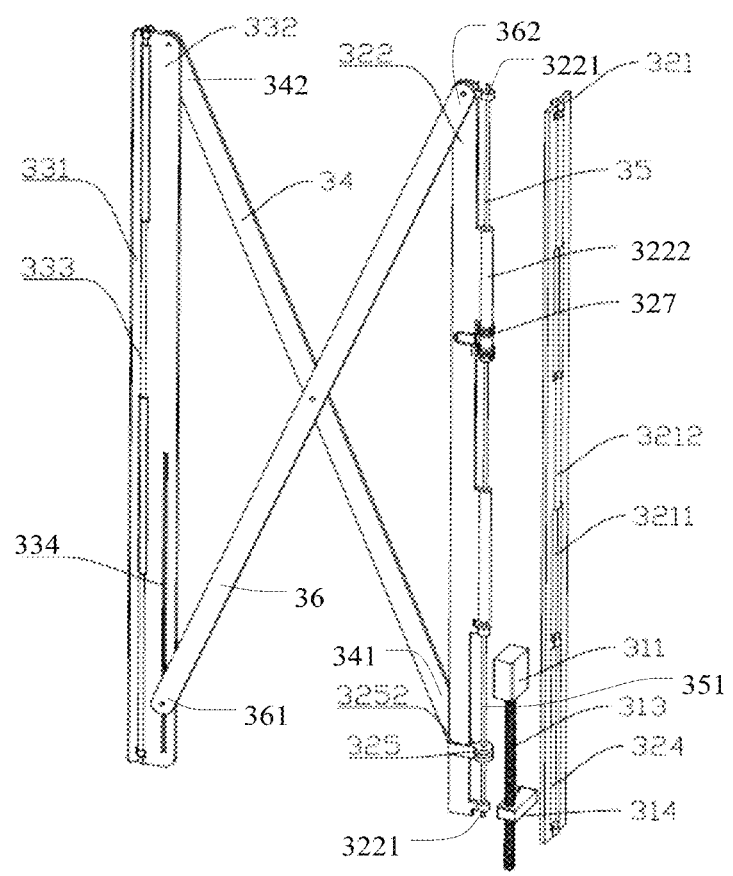
FIG. 4 is another exploded view from another angle of the second telescopic bracket of the flexible screen support device shown in FIG. 3.

Further referring to FIGS. 3, 4 and 5, one of the plurality of second telescopic brackets 30 is illustrated as an example. The driving motor 311 of the second driving unit 31 receives in the assembly slot 11, the screw rod 313 receives in the same assembly slot 11 along a length direction thereof, and the first driving block 314 receives in one end of the same assembly slot 11.

Each of the plurality of second telescopic brackets 30 includes a first assembly plate 32, a second assembly plate 33, a first support rod 34 and a second support rod 36. The first support rod 34 includes a first end 341 and a second end 342 opposite to the first end 341. The second support rod 36 includes a third end 361 and a fourth end 362 opposite to the third end 361. The first end 341 of the first support rod 34 slidably arranges on the first assembly plate 32 and the third end 361 of the second support rod 36 slidably arranges on the second assembly plate 33 respectively. The first support rod 34 and the second support rod 36 couple each other in a cross way and can rotate relative to each other. Center portions of the first support rod 34 and the second support rod 36 couple together by a shaft, then the first support rod 34 and the second support rod 36 can rotate relative to each other.

The first assembly plate 32 includes a first main assembly board 321 and a first rotating board 322. The first rotating board 322 rotatably arranges on the first main assembly board 321 through a first rotating shaft 35. The first main assembly board 321 is a strip-shaped board. A first assembly groove 324, a plurality of second assembly grooves 3211 and a plurality of assembly blocks 3212 are defined in the first main assembly board 321, along a length direction thereof. In this embodiment, there are two second assembly grooves 3211 and two assembly blocks 3212. The two second assembly grooves 3211 are spaced from each other by one assembly block 3212 and the two assembly blocks 3212 are spaced from each other by one second assembly groove 3211. The first assembly groove 324 is spaced from a second assembly groove 3211 nearest to the first assembly groove 324. The two second assembly grooves 3211 and the assembly blocks 3212 communicates with each other through axle holes. Two hinged ends 3221 respectively arrange on two ends of one side of the first rotating board 322 facing the first main assembly board 321. Two assembly cylinders 3222 convexly arranges between the two hinged ends 3221 and are spaced from each other.

The first rotating board 322 installs on the first main assembly board 321. The two assembly cylinders 3222 insert into the two second assembly grooves 3211, and one of the two assembly cylinders 3222 locates between the two assembly blocks 3212, the other of the two assembly cylinders 3222 locates between the assembly block 3212 and the first assembly groove 324. The first rotating shaft 35 passes through the first assembly groove 324, the plurality of second assembly grooves 3211, the two assembly cylinders 3222 and are rotatably limited by the two hinged ends 3221. The first main assembly board 321 and the first rotating board 322 rotatably couple. The first assembly groove 324 is defined to be a limiting area, one portion of the first rotating shaft 35 received in the first assembly groove 324 is defined to be a first section 351 and other portion of the first rotating shaft 35 is defined to be a second section.

In one embodiment, a first pushing member 325 sleeves on the first section 351 of the first rotating shaft 35, and the first pushing member 325 can slide along an axial direction of the first rotating shaft 35. The first pushing member 325 couples the first driving block 314 and the first end 341 of the first support rod 34. The first pushing member 325 drives the first support rod 34 to slide along a length direction of the first assembly plate 32. The first end 341 of the first support rod 34 and the fourth end 362 of the second support rod 36 couples the first rotating board 322. The first end 341 of the first support rod 34 coupling the first pushing member 325 is driven by the first pushing member 325 to slidably move on the first rotating board 322, along the axial direction of the first rotating shaft 35. The fourth end 362 of the second support rod 36 rotates around a first axis 323 pivotally penetrating an end of the second section of the first rotating board 322 that is away from the first section 351.

Referring to FIG. 3, the first driving block 314 includes a coupling end 3141 in an arc shape. The first pushing member 325 includes a coupling slot 3251 in an arc shape. The coupling end 3141 inserts into the coupling slot 3251, thus the first pushing member 325 can drive the first driving block 314 to rotate around the first rotating shaft 35, thus avoiding the first driving block 314 obstructing the rotation of the first pushing member 325. The first pushing member 325 includes a coupling end 3252 coupling the first end 341 of the first support rod 34 which slidably connects to the first rotating board 322.

The second assembly plate 33 includes a first main coupling plate 331 and a second rotating board 332. The second rotating board 332 rotatably installs on the first main coupling plate 331 through a second rotating shaft 333. The second end 342 of the first support rod 34 and the third end 361 of the second support rod 36 couple the second rotating board 332. The first main coupling plate 331 and the second rotating board 332 combined together are equivalent to a hinge structure.

Referring to FIGS. 3-5 and 7, a second sliding slot 334 is defined on one end of the second rotating board 332. A first sliding slot 326 is defined on one end of the first rotating board 322. The first support rod 34 and the second support rod 36 couple each other in a cross way (as X-shaped), and then configure between the first assembly plate 32 and the second assembly plate 33, and couple the first assembly plate 32 and the second assembly plate 33. The first sliding slot 326 faces to the second sliding slot 334 at the corresponding sides of the first rotating board 322 and the second rotating board 332. The first pushing member 325 can slidably move along the first sliding slots 326. The first end 341 of the first support rod 34 coupling the first pushing member 325 is slidably received in the first sliding slot 326. The third end 361 of the second support rod 36 is received in the second sliding slot 334, thus the first support rod 34 and the second support rod 36 can be open or closed. The second end 342 of the first support rod 34 rotates around a second axis 335 pivotally penetrating the second assembly plate 33. The fourth end 362 of the second support rod 36 rotates around the first axis 323 pivotally penetrating the first assembly plate 32. The first main coupling board 331 configures to couple the flexible screen 200. The first main assembly board 321 couples one side of the support board 10 whereon the assembly slots 11 define. When the first driving block 314 drives the first pushing member 325 to slide along the first rotating shaft 35, the first pushing member 325 pushes the first end 341 of the first support rod 34 to slide along the first sliding slot 326 and pushes the third end 361 of the second support rod 36 to slide along the second sliding slots 334, thereby the first end 341 of the first support rod 34 pushed by the first pushing member 325 is close to the fourth end 362 of the second support rod 36, the second end 342 of the first support rod 34 is close to the third end 361 of the second support rod 34, the second assembly plate 33 is pushed away from the first assembly plate 32, thus the second assembly bracket 30 can be expanded. In other embodiments, a second sliding slot is defined on each of two opposite ends of the second rotating board 332 (one of the two second sliding slot in this embodiment is the same as the second sliding slot 334 as shown in FIG. 4, the other one similar to and substantially symmetric with the second sliding slot 334 as shown in FIG. 4). A first sliding slot is defined on each of two opposite ends of the first rotating board 322 (one of the two first sliding slots in this embodiment is the same as the first sliding slot 326 as shown in FIG. 3, the other one similar to and substantially symmetric with the first sliding slot 326 as shown in FIG. 3). Each first sliding slot corresponds and faces to one second sliding slot at the corresponding sides of the first rotating board 322 and the second rotating board 332 (the positional relation between each first sliding slot and corresponding second sliding slot in this embodiment is similar to the first sliding slot 326 and the second sliding slot 334 shown in FIGS. 3 and 4). The first end 341 of the first support rod 34 is slidably received in one first sliding slot, the second end 342 of the first support rod 34 is slidably received in one second sliding slot (the first end 341 of the first support rod 34 slidably received in one first sliding slot in this embodiment is the same as the first end 341 of the first support rod 34 slidably received in one first sliding slot 326 in the above embodiment shown in FIG. 3; the second end 342 of the first support rod 34 slidably received in one second sliding slot in this embodiment is similar to the third end 361 of the second support rod 36 received in the other second sliding slot 334 in the above embodiment shown in FIG. 4). The fourth end 362 of the second support rod 36 is received in the other first sliding slot and the third end 361 of the second support rod 36 is received in the other second sliding slot (the fourth end 362 of the second support rod 36 received in the other first sliding slot in this embodiment is similar to the first end 341 of the first support rod 34 slidably received in one first sliding slot 326 in the above embodiment shown in FIG. 3; the second end 342 of the first support rod 34 slidably received in one second sliding slot is similar to the third end 361 of the second support rod 36 received in the other second sliding slot 334 in the above embodiment shown in FIG. 4), thus the two support rods 34 can be open or closed. When the first driving block 314 drives the first pushing member 325 to slide along the first rotating shaft 35, the first pushing member 325 pushes the first end 341 of the first support rod 34 to slide along the one first sliding slot 326, pushes the second end 342 of the first support rod 34 to slide along the one second sliding slot 334, pushes the third end 361 of the second support rod 36 to slide along the other second sliding slot 334, and pushes the fourth end 362 of the second support rod 36 to slide along the other first sliding slots 326, thereby the first end 341 of the first support rod 34 pushed by the first pushing member 325 is close to the fourth end 362 of the second support rod 34, the second end 342 of the first support rod 34 is close to the third end 361 of the second support rod 34, the second assembly plate 33 is pushed away from the first assembly plate 32, thus the second assembly bracket 30 can be expanded.

Further, a torsion spring 327 arranges on the first main assembly board 321. The torsion spring 327 locates on the second section of the first rotating shaft 35. Specifically, the torsion spring 327 sleeves on outside of one of the assembly cylinder 3222 and abuts against the first main assembly board 321 and the first rotating board 322. During the rotation of the second assembly plate 32 relative to the support plate 10 and the flexible screen, a torsion force of the torsion spring 327 prevents the excessive swing of the flexible screen 200 driven by the second assembly plate 32.

Referring to FIG. 6, a structure of the first telescopic bracket 20 is substantially the same as that of the second telescopic bracket 30, the only difference is that the first telescopic bracket 20 can only extend and retract, and are unable to rotate relative to the support plate 10. Specifically, the first telescopic bracket 20 includes a third assembly plate 21, a fourth assembly plate 22, a third support rod 24 and a fourth support rod 26. In an embodiment, one end of the third support rod 24 slidably arranges on one end of the third assembly plate 21, one end of the fourth support rod 26 slidably arranges on the one end of the fourth assembly plate 22, the other end of the third support rod 24 rotates around a third axis (not shown) pivotally penetrating the other end of the fourth assembly plate 21, and the other end of the fourth support rod 26 rotates around a fourth axis (not shown) pivotally penetrating the other end of the third assembly plate 22. In other embodiments, two ends of the third support rod 24 slidably arrange on the one end of the third assembly plate 21 and the one end of the fourth assembly plate 22, respectively, and two ends of the fourth support rod 26 slidably arrange on the other end of the third assembly plate 21 and the other end of the fourth assembly plate 22, respectively. The third support rod 24 and the fourth support rod 26 couple each other in a cross way and can rotate relative to each other.

The third assembly plate 22 includes a second main assembly board 221 and a third rotating board 223. In this embodiment, the third rotating board 223 fixes on the second main assembly board 221, and the second main assembly board 221 couples the support board 10, thus the first telescopic bracket 20 is fixed relative to the support plate 10. In other embodiments, the third rotating board 223 may rotatably arranges on the second main assembly board 221 through a third rotating shaft 222. The fourth assembly plate 21 includes a main coupling plate 211 and a fourth rotating board 212 rotatably arranging on the main coupling plate 211 through a fourth rotating shaft 213. In an embodiment, one end of the third support rod 24 slidably couples one end of the third rotating board 223, and the other end of the third support rod 24 rotates around an axis pivotally penetrating one end of the fourth rotating board 212. One end of the fourth support rod 26 slidably couples the other end of the fourth rotating board 212, and the other end of the fourth support rod 26 rotates around an axis pivotally penetrating one end of the third rotating board 223. In other embodiments, two ends of the third support rod 24 slidably arrange on the third rotating board 223 and the fourth rotating board 212, respectively. Two ends of the fourth support rod 26 slidably arrange on the third rotating board 223 and the fourth rotating board 212, respectively. The third support rod 24 and the fourth support rod 26 rotatably couple each other by a cross way.

Further, a slider 224 arranges on the third rotating shaft 222. The slider 224 couples the second driving block 254 and the one end of the third support rod 24, and the slider 224 drives the third support rod 24 to slide along a length direction of the third assembly plate 21. In one embodiment, a third sliding slot (not shown) is defined on one end of the third rotating board 223. A fourth sliding slot 2121 is defined on one end of the fourth rotating board 212. The third support rod 24 and the fourth support rod 26 couple each other in a cross way (as X-shaped), and then configures between the third assembly plate 22 and the fourth assembly plate 21, and couples the third assembly plate 22 and the fourth assembly plate 21. The third sliding slot faces to the fourth sliding slot 2121 at the corresponding sides of the third rotating board 212 and the fourth rotating board 223. The slider 224 can slidably move along the third sliding slot. The one end of the third support rod 24 coupling the slider 224 slidably receives in the third sliding slot and the one end of the fourth support rod 26 slidably receives in the third sliding slot 2121. The second main assembly board 221 configures to couple the support board 10. The second main coupling board 211 configures to couple the flexible screen 200. In other embodiments, a third sliding slot (not shown) is defined on each of two opposite ends of the third rotating board 223. A fourth sliding slot 2121 is defined on each of two opposite ends end of the fourth rotating board 212. Two ends of the third support rod 24 slidably receive in the third sliding slot and the fourth sliding slot 2121, respectively. Two ends of the fourth support rod 26 slidably receive in the third sliding slot and the fourth sliding slot 2121, respectively. The third rotating shaft 222 arranges on the second main coupling board 221 and includes a third section 2221 and a fourth section (not shown) spaced from the third section 2221. A second pushing member (not shown) sleeves on the third section 2221. A limiting area is defined on the third rotating board 223. The third section 2221 locates in the limiting area.

Figure 10:
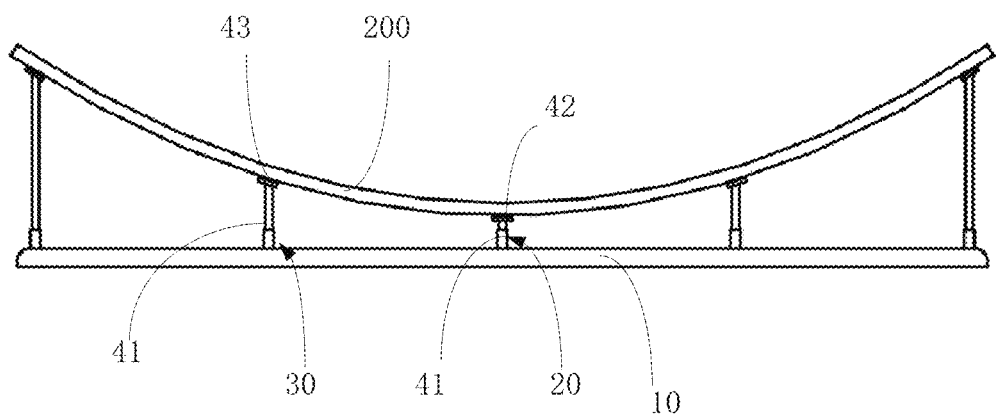
FIG. 10 is a schematic view of a flexible screen according to a second embodiment of the present disclosure, wherein the flexible screen includes a flexible screen support device.

Referring to FIG. 10, in another embodiment of the present disclosure, the driving units are a piston cylinder. The driving unit of the first telescopic bracket 20 includes a pushing rod 41 of the cylinder and a coupling block 42 coupling the pushing rod 41. The driving unit of each of the second telescopic brackets 30 includes a pushing rod 41 of the cylinder and a flexible movable block 43 coupling the pushing rod 41. The flexible screen is support by the coupling block 42 and the flexible movable block 43. The flexible movable block 43 is made of elastic and deformable material, and when the flexible screen is curved, the flexible movable block 43 can slow down the inclining force of the plurality of the second telescopic brackets 30 toward the first telescopic bracket 20.

Further, the flexible screen support device 100 includes a control device which drives the first telescopic bracket 20 and the plurality of second telescopic brackets 30 to move.

Figure 8:
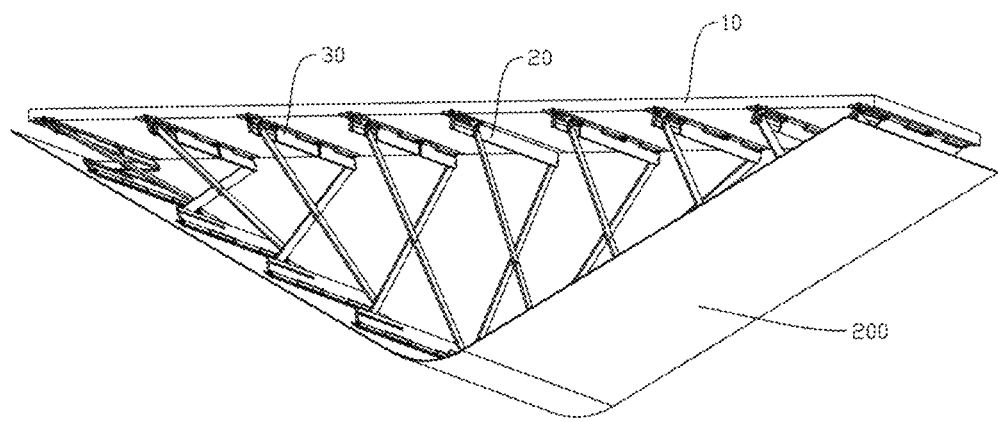
FIGS. 8 and 9 are schematic views of the flexible screen of the present disclosure shown in FIG. 1, wherein states of the flexible screen are changed by the flexible screen support device.
Figure 9:
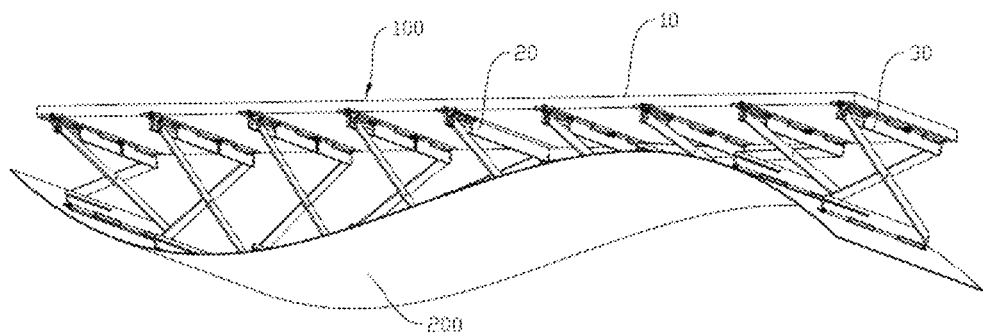

When the flexible screen support device 100 is driven by the control device, the flexible screen 200 transforms into a reset shape, as shown in FIGS. 1, 8 and 9, for example, a shape of the flexible screen 200 transforms into a concave arc-shape, and the second driving unit 25 of the first telescopic bracket 20 located in a middle position drives the one end of the third support rod 24 to slide away from the other end of the fourth support rod 26, thus a value of an angle α between the third support rod 24 and the fourth support rod 26 increases to maximum, and the third assembly plate 21 and the fourth assembly plate 22 are relatively closed to each other. Further, a distance between a portion of the flexible screen 200 coupling the first telescopic bracket 20 and the support plate 10 is shortened. Then the second telescopic brackets 30 located on two opposite sides of the first telescopic bracket 20 are sequentially extended relative to the support plate 10, and extending lengths of the second telescopic brackets 30 are sequentially grow and are greater than the length of the first telescopic bracket 20. The second telescopic bracket 30 driven by the second driving unit 31 drives the first pushing member 325 to slide along the first rotating shaft 35 in the limiting area, and further pushes the first support rods 34 coupling the first pushing member 325 to slide along the first sliding slot 326, thus the first support rod 34 and the second support rod 36 can be opened or closed, further, the second telescopic bracket 30 can be contracted or expanded. In this process, the plurality of second telescopic brackets 30 suffer pulling force caused by the support plate 10 and the flexible screen 200. In order to prevent the damage of the flexible screen and realized the deformation of the flexible screen to be the curved surface, the first rotating board 322 of each first assembly plate 31 drives one first support rod 34 and one second support rod 36 to rotate relative to the first main assembly board 321, while the second rotating board 332 of each second assembly plate 33 drives the first main coupling plate 331 to rotate, thus an angle between each of the plurality of second telescopic brackets 30 and the support plate 10 is changed along with the deformation of the flexible screen 200; meanwhile, the first telescopic bracket 20 is fixed relative to the support plate 10 to avoid rotating, thus other second telescopic brackets 30 may have a stable supporting point when the shape of the flexible screen 200 changes.

The flexible screen support device 100 described in present disclosure couples the support plate 10 and the flexible screen 200 through the first telescopic bracket 20 and a plurality of second telescopic brackets 30. The expansion and contraction of the first telescopic bracket 20 and a plurality of second telescopic brackets 30 in different degrees drive the flexible screen 200 to form a curved surface, thus the flexible screen 200 can have diversified display modes.

What is claimed is:

1. A flexible screen support device, configuring for supporting a flexible screen, comprising:
   a support plate;
   a first telescopic bracket; and
   a plurality of second telescopic brackets locating on two opposite sides of the first telescopic bracket;
   wherein the first telescopic bracket and the plurality of second telescopic brackets couple the support plate and the flexible screen;
   wherein the first telescopic bracket and the plurality of second telescopic brackets drive the flexible screen to form a curved surface;
   wherein each of the second telescopic brackets comprises a first assembly plate;
   wherein each first assembly plate comprises a first main assembly board and a first rotating board rotatably arranging on the first main assembly board, the first main assembly board couples one side of the support board.

2. The flexible screen support device of claim 1, wherein the first telescopic bracket couples a first driving unit, and each of the plurality of second telescopic brackets couples a second driving unit; wherein the first driving unit and each of the second driving unit comprises a driving motor, a screw rod coupling the driving motor, and a driving block sleeving on the screw rod; wherein the screw rod drives the driving block to expand and retract the first telescopic bracket and the second telescopic bracket.

3. The flexible screen support device of claim 2, wherein the first driving unit and each second driving unit are piston cylinders; the first driving unit of the first telescopic bracket comprises a pushing rod of the cylinder and a coupling block coupling the pushing rod, and the second driving unit of the second telescopic bracket comprises a pushing rod of the cylinder and a flexible movable block coupling the pushing rod; wherein the flexible screen is support by the coupling block and the flexible movable block.

4. The flexible screen support device of claim 1, wherein each of the second telescopic brackets comprises a second assembly plate, a first support rod comprising a first end and a second end, and a second support rod comprising a third end and a fourth end; wherein the first end and the fourth end slidably arrange on the first assembly plate, and the second end and the third end slidably arrange on the second assembly plate; wherein the first support rod and the second support rod couple each other in a cross way and rotate relative to each other.

5. The flexible screen support device of claim 1, wherein each of the second telescopic brackets comprises a second assembly plate, a first support rod comprising a first end and a second end, and a second support rod comprising a third end and a fourth end; wherein the first end slidably arrange on one end of the first assembly plate, the second end rotates around a second axis pivotally penetrating the other end of the second assembly plate, the third end slidably arrange on one end of the second assembly plate and the forth end rotates around a first axis pivotally penetrating the other end of the first assembly plate; the first support rod and the second support rod couple each other in a cross way and rotate relative to each other.

6. The flexible screen support device of claim 1, wherein each of the second telescopic brackets comprises a second assembly plate, a first support rod comprising a first end and a second end and a second support rod comprising a third end and a fourth end;
wherein a first rotating shaft and a first pushing member arrange on the first assembly plate;
wherein the first pushing member rotatably sleeves on the first rotating shaft and slides along a length direction of the first rotating shaft; wherein the first pushing member couples a driving block of a first driving unit and the first end of the first support rod; wherein the first pushing member drives the first support rod to slide along a length direction of the first assembly plate.

7. The flexible screen support device of claim 6, wherein the first main assembly board and the first rotating board rotatably arranges on the first main assembly board through the first rotating shaft;
wherein the first end and the fourth end couples the first rotating board; wherein the first end of the first support rod coupling the first pushing member slidably moves on the first rotating board along an axial direction of the first rotating shaft.

8. The flexible screen support device of claim 6, wherein the first rotating shaft arranges on the first main assembly board, and comprises a first section and a second section; wherein the first pushing member sleeves on the first section of the first rotating shaft; wherein a limiting area is defined on the first rotating board and the first section locates therein.

9. The flexible screen support device of claim 8, wherein a torsion spring arranges on the first main assembly board, locates on the second section of the first rotating shaft, and abuts against the first main assembly board and the first rotating board.

10. The flexible screen support device of claim 6, wherein the second assembly plate comprises a main coupling plate and a second rotating board rotatably installing on the main coupling plate through a second rotating shaft; wherein the second end and the third end couple the second rotating board.

11. The flexible screen support device of claim 10, wherein a first sliding slot is defined on one end of the first rotating board, and a second sliding slot is defined on one end of the second rotating board; wherein the first end slidably receives in the first sliding slot, and the third end slidably receives in the second sliding slot.

12. The flexible screen support device of claim 6, wherein center portion of the first support rod and center portion of the second support rod couple together by a shaft.

13. The flexible screen support device of claim 6, wherein the driving block of the first driving unit comprises a coupling end in arc shape and the first pushing member comprises a coupling slot in arc shape; wherein the coupling end inserts into the coupling slot, and the first pushing member drives the driving block of the first driving unit to rotate around the first rotating shaft.

14. The flexible screen support device of claim 1, wherein the first telescopic bracket comprises a third assembly plate, a fourth assembly plate, a third support rod and a fourth support rod; wherein two ends of the third support rod slidably arranges on one end of the third assembly plate and one end of the fourth assembly plate, respectively, and two ends of the fourth support rod slidably arranges on other end of the third assembly plate and other end of the fourth assembly plate, respectively; wherein the third support rod and the fourth support rod couple each other in a cross way and rotate relative to each other.

15. The flexible screen support device of claim 14, wherein the third assembly plate comprises a second main assembly board and a third rotating board arranging on the main assembly board, and, the fourth assembly plate comprises a second main coupling plate and a fourth rotating board arranging on the main coupling plate; wherein the two ends of the third support rod slidably arranges on one end of the third rotating board and one end of the fourth rotating board, respectively, and the two ends of the fourth support rod slidably arranges on other end of the third rotating board and other end of the fourth rotating board, respectively.

16. The flexible screen support device of claim 15, wherein the fourth rotating board rotatably arranges on the main coupling plate through a fourth rotating shaft, a slider arranges on the fourth rotating shaft, the slider couples a driving block of a second driving unit and the one end of the third support rod, and drives the third support rod to slide along a length direction of the fourth assembly plate.

17. The flexible screen support device of claim 16, wherein the fourth rotating shaft arranges on the second main coupling board and comprises a third section and a fourth section spaced from the third section; wherein a second pushing member sleeves on the third section; wherein a limiting area is defined on the fourth rotating board; wherein the third section locates in the limiting area.

18. The flexible screen support device of claim 1, further comprising a control device which drives the first telescopic bracket and the plurality of second telescopic brackets to move.

19. A flexible screen, comprising a display surface, a back surface, and a flexible screen support device of claim 1; wherein the flexible screen support device couples the back surface.

* * * * *